(12) United States Patent
Daga et al.

(10) Patent No.: US 9,697,176 B2
(45) Date of Patent: Jul. 4, 2017

(54) EFFICIENT SPARSE MATRIX-VECTOR MULTIPLICATION ON PARALLEL PROCESSORS

(71) Applicant: Advanced Micro Devices, Inc., Sunnyvale, CA (US)

(72) Inventors: Mayank Daga, Austin, TX (US); Joseph L. Greathouse, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 160 days.

(21) Appl. No.: 14/542,003

(22) Filed: Nov. 14, 2014

(65) Prior Publication Data

US 2016/0140084 A1    May 19, 2016

(51) Int. Cl.
*G06F 7/00*       (2006.01)
*G06F 17/16*      (2006.01)

(52) U.S. Cl.
CPC .................... *G06F 17/16* (2013.01)

(58) Field of Classification Search
USPC ........................................................ 708/207
See application file for complete search history.

(56) References Cited

U.S. PATENT DOCUMENTS

2013/0191425 A1*  7/2013  Porikli ................. G06K 9/6249
                                                      708/207

OTHER PUBLICATIONS

Bell et al., "Sparse Matrix-Vector Multiplication on Throughput-Oriented Processors," NVIDIA Research, copyright 2008 NVIDIA Corporation (28 pages).
Bell et al., "Implementing Sparse Matrix-Vector Multiplication on Throughput-Oriented Processors," NVIDIA Research, copyright ACM, 2009 (11 pages).
Greathouse et al., "Efficient Sparse Matrix-Vector Multiplication on GPUs using the CSR Storage Format," AMD Research, SC14, Nov. 16-21, 2014, New Orleans; copyright 2014 IEEE (12 pages).
Yan et al., "yaSpMV: Yet Another SpMV Framework on GPUs," PPoPP '14, Feb. 15-19, 2014, Orlando, Florida; copyright 2014 AMC (12 pages).
Su et al., "clSpMV: A Cross-Platform OpenCL SpMV Framework on GPUs," ICS '12, Jun. 25-29, 2012, San Servolo Island, Venice, Italy; copyright 2012 ACM (12 pages).
Davis et al., "SpMV: A Memory-Bound Application on the GPU Stuck Between a Rock and a Hard Place," Microsoft Research Silicon Valley, 2012 (10 pages).

* cited by examiner

*Primary Examiner* — Tan V. Mai
(74) *Attorney, Agent, or Firm* — Volpe and Koenig, P.C.

(57) ABSTRACT

A method of multiplication of a sparse matrix and a vector to obtain a new vector and a system for implementing the method are claimed. Embodiments of the method are intended to optimize the performance of sparse matrix-vector multiplication in highly parallel processors, such as GPUs. The sparse matrix is stored in compressed sparse row (CSR) format.

30 Claims, 5 Drawing Sheets

|   | 0 | 1 | 2 | 3 | 4 |
|---|---|---|---|---|---|
| 0 | 2.0 | - | 3.5 | - | 6.7 |
| 1 | - | 8.2 | - | 9.2 | - |
| 2 | - | 1.1 | 2.8 | - | - |
| 3 | 3.0 | - | 1.5 | 4.5 | - |
| 4 | - | 2.5 | - | 8.9 | - |

— 105

| | 0 | 1 | 2 | 3 | 4 | 5 | 6 | 7 | 8 | 9 | 10 | 11 |
|---|---|---|---|---|---|---|---|---|---|---|---|---|
| Values | 2.0 | 3.5 | 6.7 | 8.2 | 9.2 | 1.1 | 2.8 | 3.0 | 1.5 | 4.5 | 2.5 | 8.9 |

— 110

| | 0 | 1 | 2 | 3 | 4 | 5 | 6 | 7 | 8 | 9 | 10 | 11 |
|---|---|---|---|---|---|---|---|---|---|---|---|---|
| Col-Index | 0 | 2 | 4 | 1 | 3 | 1 | 2 | 0 | 2 | 3 | 1 | 3 |

— 115

| | 0 | 1 | 2 | 3 | 4 | 5 |
|---|---|---|---|---|---|---|
| Rows-Delimiter | 0 | 3 | 5 | 7 | 10 | 12 |

EFFICIENT SPARSE MATRIX-VECTOR MULTIPLICATION ON PARALLEL PROCESSORS

FIELD OF THE INVENTION

The present invention is generally directed to computing, and in particular, to computing using highly parallel processors.

BACKGROUND

A sparse matrix is a matrix in which a majority of matrix elements have a value of zero. Sparse matrices are extensively used in such applications such as linear algebra, many engineering disciplines, physics, data mining, and graph analytics. Many of these applications rely on multiplication of a vector by a sparse matrix to yield a new vector. There are thus demands for efficient methods of performing such operations. Parallel processors, such as graphics processors may be used to meet such demands.

Graphics processors, or graphics processing units (GPUs), are highly parallel computation devices. As the name implies, they were originally developed for fast and efficient processing of visual information, such as video. More recently, however, they have been engineered to be more general purpose massively parallel devices. Current GPUs may execute thousands of computations concurrently, and this number is bound to increase with time. Such parallel computations are referred to as threads. In order to reduce hardware complexity (and thus allow more parallel compute units in a chip), GPUs bundle numerous threads together and require them to execute in a single-instruction-multiple-data (SIMD) fashion. That is, the same instructions are executed simultaneously on many distinct pieces of data. Such a bundle of threads is called a wavefront, a warp, or other names. In addition, a given processor, such as a GPU, may include multiple real or virtual processors that may run in parallel, each with its own threads and wavefronts. Each of such virtual processors is called a workgroup, thread block, or other names. A collection of virtual processors or workgroups may share a single real processor.

SUMMARY OF ONE OR MORE EMBODIMENT(S)

A method of multiplication of a sparse matrix and a vector to obtain a new vector and a system for implementing the method are claimed. Embodiments of the method are intended to optimize (i.e., improve) the performance of sparse matrix-vector multiplication in highly parallel processors, such as GPUs. The sparse matrix is stored in compressed sparse row (CSR) format. The method includes partitioning the matrix into blocks of consecutive rows; and for each block having more than a minimum number of rows: determining a number of non-zero matrix elements in the block; executing a first process for sparse-matrix vector multiplication on rows of the block if a number of non-zero matrix elements in the block is less than or equal to a maximum; and executing a second process for sparse-matrix vector multiplication, distinct from the first process, if the number of non-zero matrix elements is greater than the maximum.

BRIEF DESCRIPTION OF THE DRAWINGS

A more detailed understanding may be had from the following description, given by way of example in conjunction with the accompanying drawings wherein:

FIG. 1 shows an example of a format for storing a sparse matrix;

DETAILED DESCRIPTION OF EMBODIMENT(S)

Figure 2:
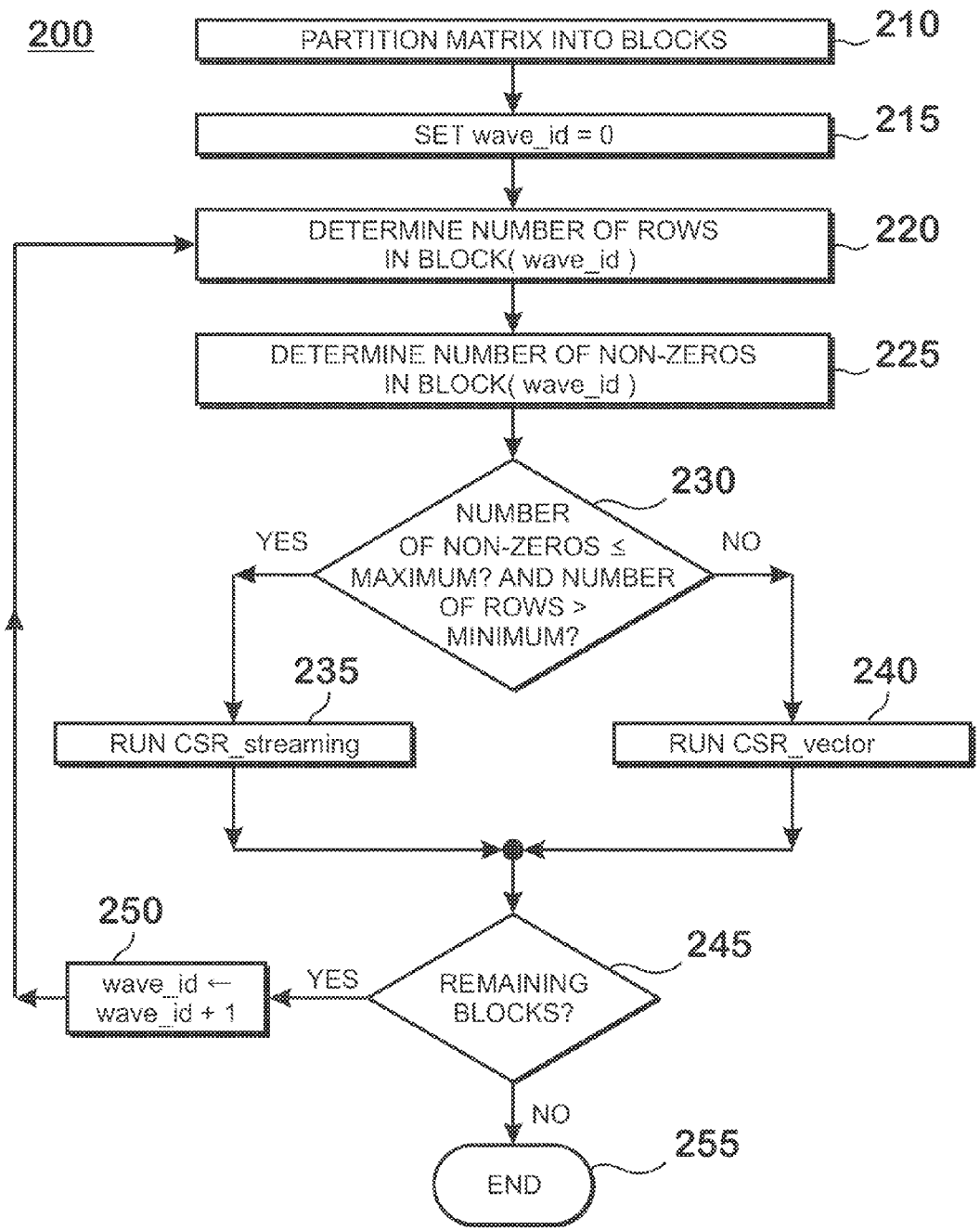
FIG. 2 shows an embodiment of a method for sparse matrix-vector multiplication.

Described herein are one or more methods, apparatus and system(s) for sparse matrix-vector multiplication. The method may be implemented on, as examples, a parallel processor or a processor configured to perform single-instruction-multiple-data (SIMD) operations. Examples of such processors include, but are not limited to, graphics processing units (GPUs), traditional vector processors, SIMD processors such as central processing units (CPUs) with SSE or AVX instructions, highly-parallel CPUs, processors (sometimes referred to as APUs) incorporating one or more CPUs and one or more GPUs, and digital signal processors (alone or in combination with other processors). Embodiments of the claimed method are based on the matrix being stored in Compressed Sparse Row (CSR) format. Previous methods using this storage format have shown disappointing performance due to issues such as load imbalance, lack of parallelism, and irregular, uncoalesced memory accesses. One such previous method, called CSR-vector, is described, for example, in the publication "Implementing Sparse Matrix-Vector Multiplication on Throughput-Oriented Processors" by N. Bell and M. Garland, which is available at http://dx.doi.org/10.1145/1654059.1654078, and is hereby incorporated by reference as if fully set forth herein. CSR-vector assigns one wavefront to work on a single row of the matrix. This allows wavefronts to access consecutive memory locations in parallel, resulting in fast coalesced loads. However, CSR-Vector can frequently result in poor performance for matrix rows containing too few non-zero matrix elements, also called non-zeros. For example, a 64-wide SIMD unit (for example, a SIMD wavefront with 64 threads) will have many unused execution resources when operating on a row with only 32 non-zeros. The method and system claimed herein overcome this problem and, more generally, use parallel processor resources more efficiently in sparse matrix-vector multiplication. In particular, by contrast to CSR-vector, in the claimed method, multiple rows of the matrix are processed in one wavefront.

FIG. 1 provides an example of a sparse matrix 105 stored using the CSR format. For visual clarity, zeros in matrix 105 are shown simply as dashes. Columns of the matrix are indexed 0 through 4 across the top of the matrix and rows are indexed 0-4 along the left edge.

CSR format uses three arrays, or buffers 110, 115, 120 to store a matrix such as 105. Values buffer 110 stores only the non-zeros in a one-dimensional array. The elements are shown stored in the values buffer in order from left to right and then top to bottom in the matrix, but this is only for illustration purposes, and is not to be considered limiting. Entries in values buffer 110 are indexed 0-11 as shown, corresponding to 12 non-zeros in matrix 105. Column index (col-index) buffer 115 indicates the column index of each non-zero. Entries in col-index buffer 115 are indexed 1-11 as shown, corresponding to the indices of values buffer 110.

Rows delimiter buffer 120 stores where the non-zeros for each matrix row start and end in the other two buffers. For example, a first entry in rows delimiter buffer 120, namely 0, indicates that the first non-zero in the first row of the matrix (2.0) is stored in index 0 of values buffer 110 and its column is stored in the corresponding index 0 of col-index buffer 115. A second entry in rows delimiter buffer 120, namely 3, indicates that the first non-zero in the second row of the matrix (8.2) is stored in index 3 of values buffer 110 and its column is stored in the corresponding index 3 of col-index buffer 115. In this way, values and exact locations of all non-zeros (and only non-zeros) in sparse matrix 105 are stored in a compact manner.

FIG. 2 shows an overview of an embodiment 200 of a method of multiplication of a sparse matrix and a vector to obtain a new vector, with the matrix stored in CSR format. As will be appreciated, embodiment 200 may be executed by one or more of the processors described above. The exact order of steps in FIG. 2 and order of the descriptions hereinafter are not to be construed as limiting—the order of some steps may be changed without significantly departing from the substance of the claimed method.

A method is initialized at 210 and 215. The initialization may have to be performed only once for a given matrix. At 210 the sparse matrix is partitioned into non-overlapping blocks of consecutive rows, each block containing a number of non-zeros that is less than or equal to a maximum. The maximum may be chosen based on the architecture of the parallel processor, such as a GPU, being used. The maximum may be chosen to make optimum use of memory sizes and parallel processing capabilities of the parallel processor and avoid, or minimize, unused resources in the parallel processor. For example, the maximum may be chosen based on the size of a local memory, scratchpad memory, or local data storage (LDS) in the parallel processor. The maximum may be chosen to optimize the use of processor architecture, resources, and memory during execution of a wavefront. Further details of the partitioning are described hereinafter.

In addition to partitioning of the matrix, a counter, shown as wave_id in FIG. 2, is initialized to zero at 215. This counter indicates which block is being processed. This completes the initialization.

Iteration of the method begins at 220. The number of rows in the current block, designated as block[wave_id], is determined from the CSR buffers and the partitioning 220. The number of non-zeros in block[wave_id] is determined from the CSR buffers and the partitioning 225.

At 230 the number of rows in block[wave_id] is compared with a predetermined minimum and the number of non-zeros in block[wave_id] is compared with the previously described predetermined maximum. The minimum may be selected to optimize the performance of and/or the use of resources of a processor, such as a GPU, and associated memories, as described hereinafter. The minimum may depend on specifics of processor architecture and capacity of memories associated with a processor. For example, the minimum number of rows may be determined by a number of available threads in a processor.

Returning to 230 in FIG. 2, if block[wave_id] has more than the minimum number of rows, and if the total number of non-zero matrix elements in the block is less than or equal to the maximum, a first process for sparse-matrix vector multiplication is executed on the rows of block [wave_id] 235. This first process, labeled CSR-streaming, is described in greater detail hereinafter.

If either of the aforementioned conditions on the number of rows or non-zeros in block [wave_id] is not satisfied, a second process for sparse-matrix vector multiplication, distinct from the first process, is executed on the rows of block [wave_id] 240. This second process may be CSR-vector, described hereinbefore. As one example, it may be that the number of non-zeros in a single row exceeds the maximum—that is, a block contains one row. In this case, the second process will run, with the non-zeros being processed in parallel in multiple threads.

Once the sparse-matrix vector multiplication for the rows in block [wave_id] is completed, the processor checks to see if there are any remaining row blocks 245. If there are remaining blocks, counter wave_id is incremented by 1 at 250 and the method returns to 220 to process the new block. If there are no remaining blocks the method ends 255 with a new vector now completely determined.

In an embodiment, FIG. 2 may represent the operation of a single workgroup. In another embodiment, more than one workgroup may operate in parallel to simultaneously process many blocks, thereby further increasing the parallel processing of the sparse matrix vector multiplication. The blocks may be distributed among workgroups. In this embodiment, wave_id may be initialized at 215 to a value that designates a specific workgroup. The loop from 220 to 250 may then be run in each of several workgroups in parallel, with each workgroup operating on a different set of blocks.

As an example, not to be construed as limiting, a real processor may be able to run 64 workgroups. Suppose a matrix ends up being partitioned into 128 blocks. To perform a complete sparse matrix-vector multiplication, the 128 blocks could be divided among the 64 workgroups working in parallel, with each workgroup processing two blocks by iterating the loop from 220 to 250 twice.

Figure 3:
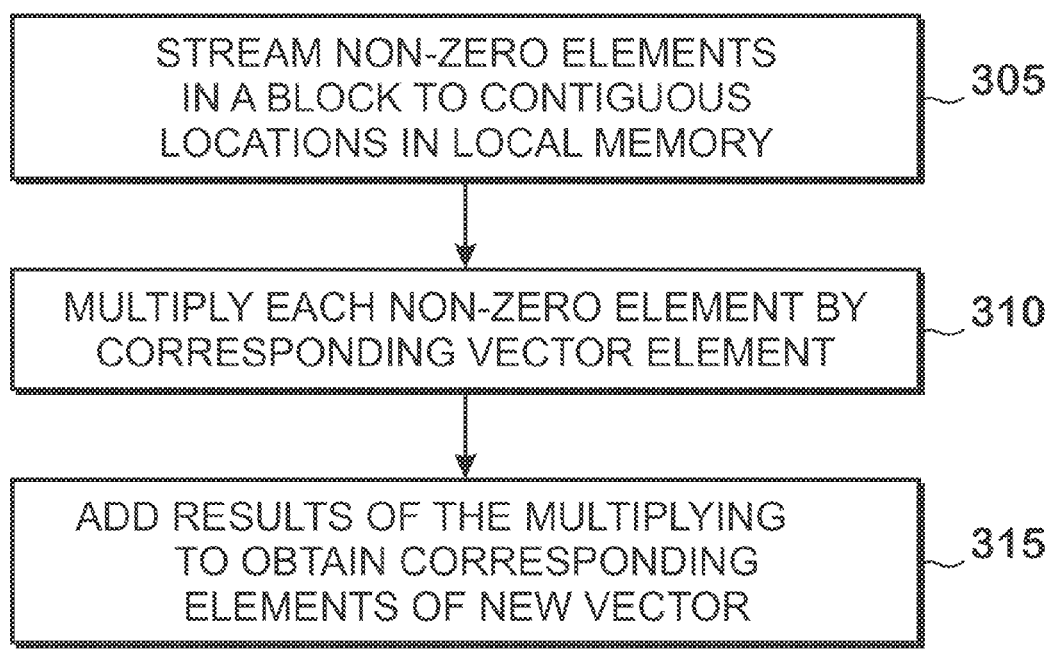
FIG. 3 shows details of an embodiment of a method for sparse matrix-vector multiplication.

FIG. 3 shows an example embodiment of a first process 300 for sparse matrix-vector multiplication, named CSR-streaming and indicated at 235 in FIG. 2. In a current block of rows, non-zero elements are streamed to contiguous locations in a local memory 305. The local memory may be integrated with a processor (e.g. on the same chip as the processor) or physically separate from the processor. Streaming to contiguous memory locations may be accomplished by the use of consecutive threads in a wavefront for certain processor and memory architectures. During, or alternatively separate from, the streaming, each non-zero is multiplied by a corresponding element of the vector 310—that is, for example, an element of a column vector corresponding to the matrix column of the non-zero. At 315, results of the multiplying from each row of the block are added to obtain each element of a new vector corresponding to each row. The adding may be referred to as reduction.

This multiplying and adding may be performed using the parallel processing capabilities of the processor to increase processing speed. The multiplying and adding may be performed in parallel for all rows in each block. For each row, the adding (reduction) may be performed in parallel by more than one thread in a wavefront. Thus, in contrast to CSR-vector, the method described here may process multiple matrix rows in one wavefront.

An example of first process 300 may also be described by the following pseudocode:

```
// Streaming to local memory
non_zero_col = rows-delimiter[start_row] + local_tid;
```

```
        local TYPE streaming_buffer[maximum];
                /* Stream maximum non-zeros and multiply with
        the corresponding vector element */
                streaming_buffer[local_tid]=
NonZeros[non_zero_col]*Vector[columns[non_zero_col]];
                // Reduction in local memory
                num_threads_red = (stop_row - start_row) / (no. of
threads in a wavefront);
                /* Each chunk of num_threads_red threads perform
reduction on one row */
                Out[start_row + local_tid] = reduced_result;
```

As described hereinbefore, initialization of claimed method 200 may include a partitioning of a matrix into non-overlapping blocks of consecutive rows 210, each block containing a number of non-zeros that is less than or equal to a maximum. In an embodiment, initialization may also include construction of an array or buffer called a rows block buffer in addition to the three buffers used in the CSR storage format. The rows block buffer may be constructed once in an initialization and then used to determine, for example, a number of rows in each block, a start row (first row) and stop row (last row) in a block, or a number of non-zeros in a block, whenever such information is needed for execution of a method such as 200 in FIG. 2.

Figure 4:
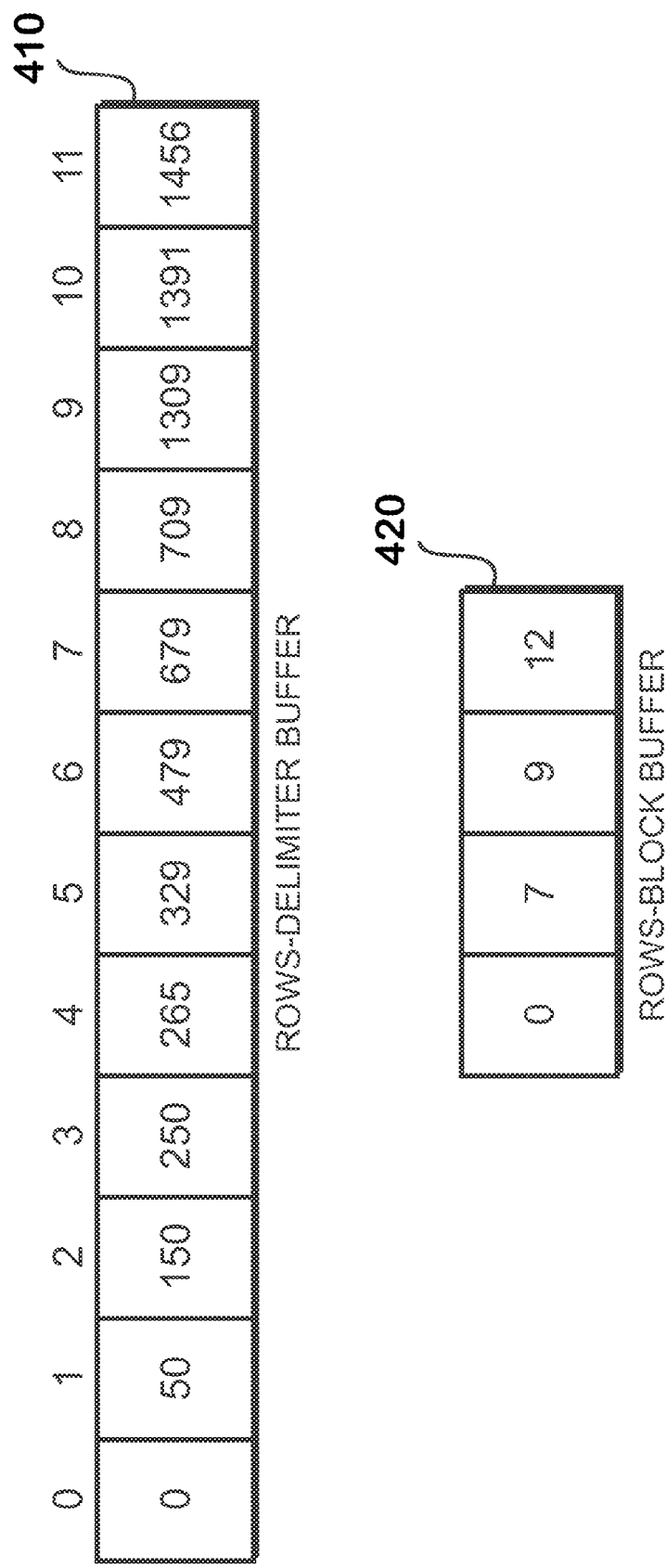
FIG. 4 shows examples of arrays for storing information about a matrix.

FIG. 4 shows an example, not to be construed as limiting, of a rows block buffer 420 and a rows delimiter buffer 410. In an embodiment, a rows delimiter buffer may be used to construct the rows block buffer 420. This is not to be construed as limiting, however, because a rows block buffer, such as 420, may be derived from other representations of a matrix, such as a Coordinate/COO format, or derived directly from a dense matrix. Example rows delimiter buffer 410 is defined in a similar manner to the one shown as 120 in FIG. 1. A matrix (not shown) is stored in CSR format that includes a values buffer (not shown) and a col-index buffer (not shown). Rows delimiter buffer 410 stores where the non-zeros for each matrix row start and end in this values buffer and in this col-index buffer. For example, a first entry in rows delimiter buffer 410, namely 0, indicates that the first non-zero in the first row of the stored matrix is stored in index 0 of the values buffer and its column is stored in the corresponding index 0 of the col-index buffer. A second entry in rows delimiter buffer 410, namely 50, indicates that the first non-zero in the second row of the matrix is stored in index 50 of the values buffer and its column is stored in the corresponding index 50 of col-index buffer.

In the example of FIG. 4 the maximum number of non-zeros in a block is fixed at 512, but this is not to be construed as limiting. Based on the entries in rows delimiter buffer 410, the maximum—512—is reached at the end of row 6 with 479 non-zeros. Hence, a first block contains row 0 through row 6, for a total of 7 rows. The first two entries in rows block buffer 420 are thereby set as 0 and 7. Again from rows delimiter buffer 410 it is determined that the next block containing less than or equal to 512 non-zeros contains rows 7 and 8, a total of two rows, resulting in the next entry in rows block buffer 420 being seven plus two, or nine. Similarly, the next block is determined to contain a single row, row 9, and the last block contains rows 10 and 11. From this it is determined that the last entry in rows block buffer 420 is 12.

As an example, rows block buffer 420 may be used to determine a number of non-zeros in block(wave_id) at 230 in FIG. 2, which determines whether a first process or a second process will be executed by the processor. A start row and a stop row may be determined for each block from the rows block buffer. Two values in the row delimiter buffer corresponding to the start row and to the stop row may then be determined. Subtracting these two values then determines the number of non-zeros in the block. This example may be described by the following pseudocode:

```
        // For every wavefront
        start_row = rows-block[wave_id];
        stop_row = rows-block[wave_id + 1];
        if(rows-delimiter [start_row] - rows-
delimiter[stop_row] <= maximum) { // fixed blocksize
            /* Run CSR-Streaming Process */
        }
        else {
            /* Run CSR-Vector Process */
        }
```

Figure 5:
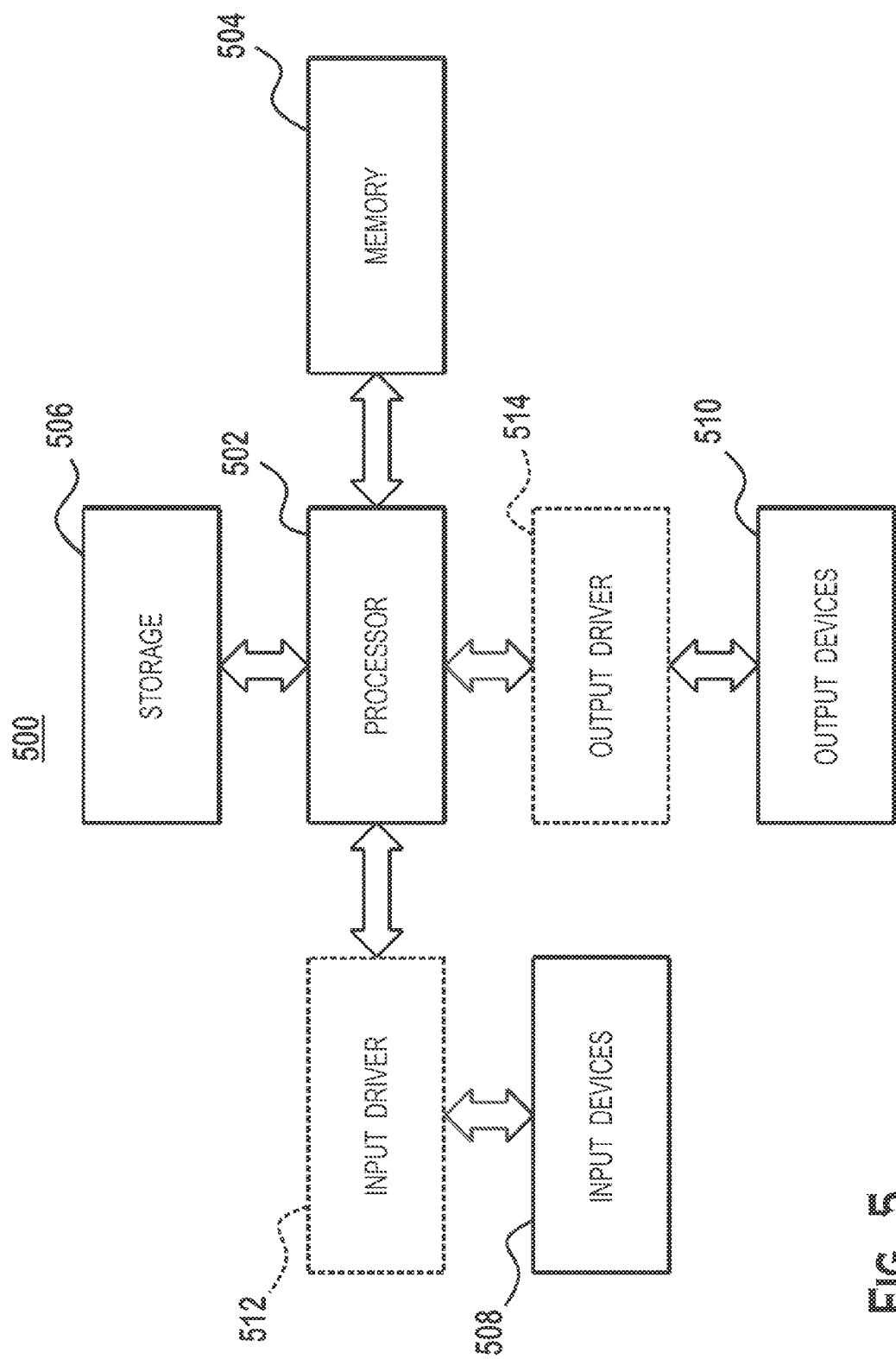
FIG. 5 is a block diagram of an example system or device in which one or more disclosed embodiments may be implemented.

FIG. 5 is a block diagram of an example device or system 500 in which one or more disclosed embodiments of a method described hereinbefore may be implemented. The system 500 may include, for example, a computer, a gaming device, a handheld device, a set-top box, a television, a mobile phone, or a tablet computer. The system 500 includes a processor 502, a memory 504, a storage 506, one or more input devices 508, and one or more output devices 510. The system 500 may also optionally include an input driver 512 and an output driver 514. It is understood that the system 500 may include additional components not shown in FIG. 5.

The processor 502 may include a central processing unit (CPU), a graphics processing unit (GPU), a parallel processor, a CPU and GPU located on the same die, or one or more processor cores, wherein each processor core may be a CPU or a GPU. The memory 504 may be located on the same die as the processor 502, or may be located separately from the processor 502. The memory 504 may include a volatile or non-volatile memory, for example, random access memory (RAM), dynamic RAM, a cache, or a scratchpad memory. Memory 504 may be a local memory or a local data storage (LDS).

The storage 506 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 may include a display, a speaker, a printer, a haptic feedback device, one or more lights, an antenna, or a network connection (e.g., a wireless local area network card for transmission and/or reception of wireless IEEE 802 signals).

The input driver 512 communicates with the processor 502 and the input devices 508, and permits the processor 502 to receive input from the input devices 508. The output driver 514 communicates with the processor 502 and the output devices 510, and permits the processor 502 to send output to the output devices 510. It is noted that the input driver 512 and the output driver 514 are optional components, and that the system 500 will operate in the same manner if the input driver 112 and the output driver 514 are not present.

The various components 502, 504, 506, 508, 510, 512, 514 of system 500 may be configured to exchange information with each other as shown by the double-headed arrows in FIG. 5. Storage 506 or memory 504 may be configured to store a sparse matrix and vector to be multiplied. A matrix, vector, or both may be stored in any memory or storage, such as 504 and 506, respectively, and loaded into a separate local memory (not shown). Alternatively or additionally, storage 506 may store an application (such applications such as linear algebra, many engineering disciplines, physics, data mining, and graph analytics or the like) which makes use of or requires sparse matrix multiplication in operation. Such applications stored in storage 506, as a consequence of exploiting the benefits of the embodiments described herein, may result in improved computation resulting in faster and/or more energy efficient generation of numerical and/or visual results. Such results may be stored in a memory such as storage 506 or memory 504. Visual results may be displayed on a display device which may be included in output devices 510). Such improved performance of the application stored in storage 506 may result in increased desirability by the marketplace for that application and/or the results of such application.

Processor 502 may be configured to implement a method of multiplication of a sparse matrix and a vector by partitioning the matrix into blocks of consecutive rows; and, for each of said blocks having more than a minimum number of rows: determining a number of non-zero matrix elements in the block; executing a first process for sparse-matrix vector multiplication on rows of the block if a number of non-zero matrix elements in the block is less than or equal to a maximum; and executing a second process for sparse-matrix vector multiplication, distinct from the first process, if the number of non-zero matrix elements is greater than the maximum. Processor 502 may be further configured to execute a second process on a block having a number of rows that is less than or equal to a minimum number of rows.

In implementing embodiments of the claimed method for sparse matrix-vector multiplication, non-zero elements in each block may be streamed to contiguous locations in memory 504 acting as a local memory. Processor 502 may be configured to stream non-zero elements in each block to contiguous locations in memory 504 by using consecutive threads in a wavefront. Multiplying and adding of non-zero matrix elements may be implemented by processor 502. A capacity of memory 504 may determine the maximum number of non-zeros in a block for optimum performance of a method embodiment by system 500.

Processor 502 in system 500 may be configured to perform the multiplying and the adding of sparse matrix-vector multiplication in parallel for all rows in each block, and to perform the adding for each row in more than one thread in a wavefront.

Processor 502 may be configured to perform a CSR-vector process, as described hereinbefore. Processor 502 may be configured to use the second process to determine an element of the new vector corresponding to a row in a block if said row is the only row in said block and the number of non-zero elements in said row exceeds the maximum.

Processor 502 may be configured to store the new vector, the product of the sparse matrix and the original vector, in storage 506.

Processor 502 may be configured to perform the partitioning of the matrix by using contents of a row delimiter buffer in the CSR format to derive a rows block buffer, the rows block buffer indicating a number of rows in each block. Processor 502 may be configured to determine a number of rows in each block by determining a start row and a stop row for each block from the rows block buffer; determining two values in the row delimiter buffer corresponding to the start row and to the stop row; and subtracting said two values to determine the number of non-zero elements in each block.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of multiplication of a sparse matrix and a vector to obtain a new vector, the sparse matrix being stored in compressed sparse row (CSR) format, the method to be executed on a parallel processor, the method comprising:
   partitioning, by the parallel processor, the matrix into blocks of consecutive rows; and
   for each of said blocks having more than a minimum number of rows:
      determining a number of non-zero matrix elements in the block;
      executing a first process for sparse-matrix vector multiplication on rows of the block if a number of non-zero matrix elements in the block is less than or equal to a maximum; and
      executing a second process for sparse-matrix vector multiplication, distinct from the first process, if the number of non-zero matrix elements is greater than the maximum.

2. The method of claim 1, wherein the determining a number of non-zero matrix elements in the block, and the executing of the first process or the executing of the second process are performed in parallel by more than one workgroup, each workgroup performing on a different set of blocks.

3. The method of claim 1, further comprising executing the second process on a block having a number of rows that is less than or equal to the minimum number of rows.

4. The method of claim 1, wherein executing the first process comprises:
   streaming non-zero elements in each block to contiguous locations in a local memory;

multiplying each non-zero element in each block with a corresponding element of the vector; and
adding results of the multiplying from each row of each block to obtain corresponding elements of the new vector.

5. The method of claim 4, wherein the streaming comprises using consecutive threads in a wavefront.

6. The method of claim 4, wherein the maximum is determined by a capacity of the local memory.

7. The method of claim 4, wherein the multiplying and adding are performed in parallel for all rows in each block.

8. The method of claim 4, wherein the adding for each row is performed by more than one thread in a wavefront.

9. The method of claim 1, wherein the second process comprises a CSR-vector process.

10. The method of claim 1, further comprising using the second process to determine an element of the new vector corresponding to a row in the block if said row is the only row in said block and the number of non-zero elements in said row exceeds the maximum.

11. The method of claim 1, wherein the partitioning of the matrix comprises deriving a rows block buffer, the rows block buffer indicating a number of rows in each block.

12. The method of claim 11, wherein the determining a number of non-zero matrix elements in the block comprises:
   determining a start row and a stop row for each block from the rows block buffer;
   determining two values in a row delimiter buffer corresponding to the start row and to the stop row; and
   subtracting said two values to determine the number of non-zero elements in each block.

13. The method of claim 1, wherein the multiplication of a sparse matrix and a vector are used in operation of a stored application, results of said operation being stored in a memory.

14. The method of claim 1, wherein the multiplication of a sparse matrix and a vector are used in operation of a stored application, results of said operation being visually displayed on a display device.

15. A system configured to multiply a sparse matrix and a vector to obtain a new vector, the system comprising:
   a parallel processor;
   a storage configured to exchange information with the processor and store the vector and the sparse matrix, the sparse matrix being stored in compressed sparse row (CSR) format; and
   a local memory configured to exchange information with the processor;
   wherein the parallel processor is configured to implement a method of multiplication of the sparse matrix and the vector; the method comprising:
      partitioning the matrix into blocks of consecutive rows; and
      for each of said blocks having more than a minimum number of rows:
         determining a number of non-zero matrix elements in the block;
         executing a first process for sparse-matrix vector multiplication on rows of the block if a number of non-zero matrix elements in the block is less than or equal to a maximum; and
         executing a second process for sparse-matrix vector multiplication, distinct from the first process, if the number of non-zero matrix elements is greater than the maximum.

16. The system of claim 15, wherein the processor is configured to perform the determining a number of non-zero matrix elements in the block, and the executing of the first process or the executing of the second process in parallel in more than one workgroup, each workgroup performing on a different set of blocks.

17. The system of claim 15, wherein the processor is further configured to execute the second process on a block having a number of rows that is less than or equal to the minimum number of rows.

18. The system of claim 15, wherein the processor is configured to execute the first process by:
   streaming non-zero elements in each block to contiguous locations in the local memory;
   multiplying each non-zero element in each block with a corresponding element of the vector; and
   adding results of the multiplying from each row of each block to obtain corresponding elements of the new vector.

19. The system of claim 18, wherein the processor is configured to stream non-zero elements in each block to contiguous locations in the local memory by using consecutive threads in a wavefront.

20. The system of claim 18, wherein the processor is configured to perform the multiplying and the adding in parallel for all rows in each block.

21. The system of claim 18, wherein the processor is configured to perform the adding for each row in more than one thread in a wavefront.

22. The system of claim 15, wherein a capacity of the local memory determines the maximum.

23. The system of claim 15, wherein the local memory is integrated with the processor.

24. The system of claim 15, wherein the second process comprises a CSR-vector process.

25. The system of claim 15, wherein the processor is configured to use the second process to determine an element of the new vector corresponding to a row in the block if said row is the only row in said block and the number of non-zero elements in said row exceeds the maximum.

26. The system of claim 15 wherein the processor is configured to store the new vector in the storage.

27. The system of claim 15, wherein the processor is configured to perform the partitioning of the matrix by deriving a rows block buffer, the rows block buffer indicating a number of rows in each block.

28. The system of claim 27, wherein the processor is configured to determine a number of rows in each block by:
   determining a start row and a stop row for each block from the rows block buffer;
   determining two values in a row delimiter buffer corresponding to the start row and to the stop row; and
   subtracting said two values to determine the number of non-zero elements in each block.

29. The system of claim 15, wherein the processor is configured to:
   operate an application stored in the storage, wherein the multiplication of the sparse matrix and the vector are used in the application; and
   store results of said operating of the application.

30. The system of claim 15, further comprising a display device, wherein the processor is configured to:
   operate an application stored in the storage, wherein the multiplication of the sparse matrix and the vector are used in the application; and
   display results of said operating of the application on the display device.

* * * * *